UNITED STATES PATENT OFFICE.

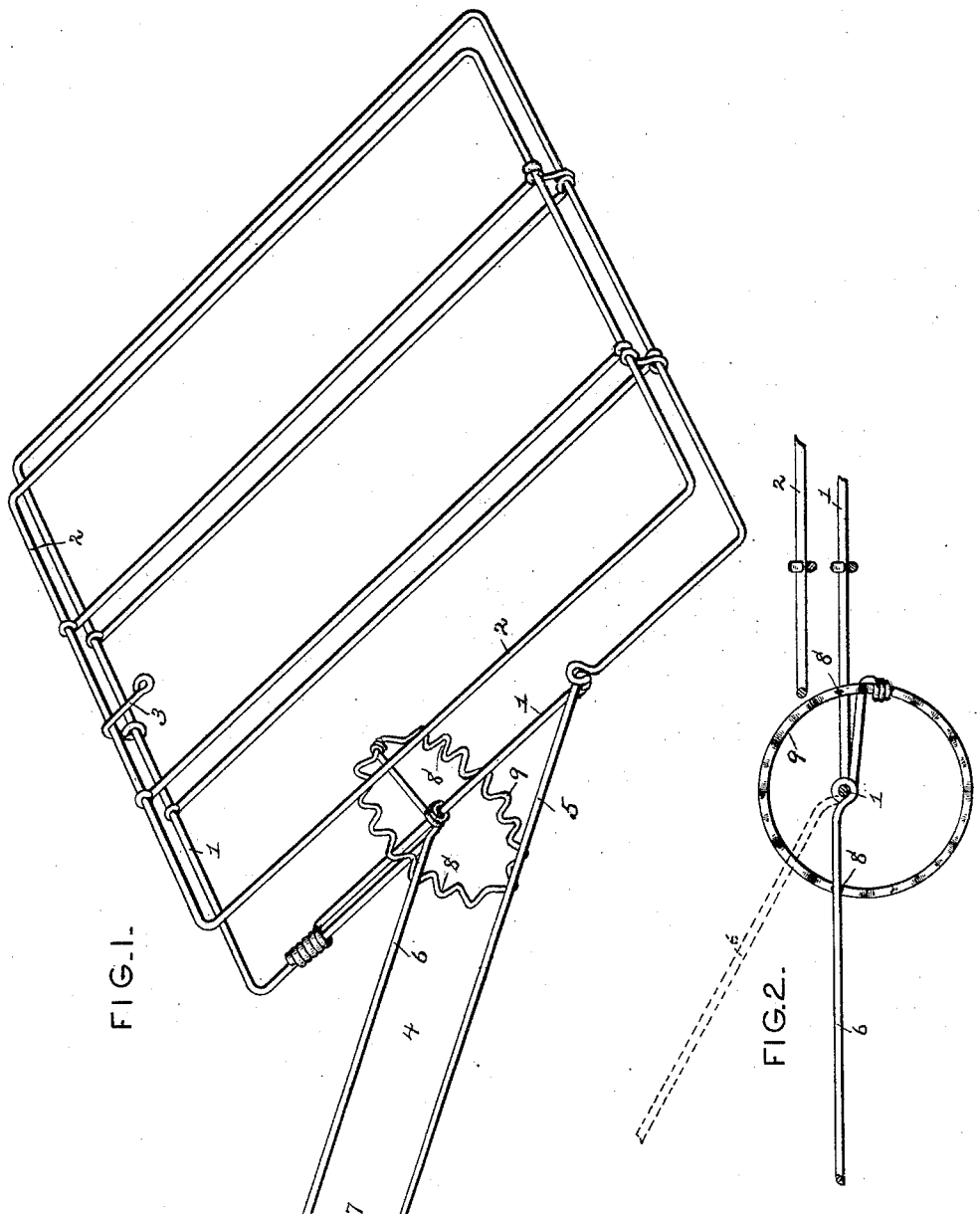

LA MONT L. BRIGGS, OF NEW HAMPTON, IOWA.

BROILER.

SPECIFICATION forming part of Letters Patent No. 476,916, dated June 14, 1892.

Application filed February 8, 1892. Serial No. 420,752. (No model.)

*To all whom it may concern:*

Be it known that I, LA MONT L. BRIGGS, a citizen of the United States, residing at New Hampton, in the county of Chickasaw and State of Iowa, have invented a new and useful Broiler, of which the following is a specification.

The invention relates to improvements in broilers.

The object of the present invention is to provide a simple and inexpensive broiler of which the handle may be readily adjusted at any desired angle to the jaws or sections, whereby the meat or other articles being cooked may be uniformly exposed to the fire without liability of burning the hands.

The invention consists in the construction and novel combination and arrangement of parts hereinafter fully described, illustrated in the accompanying drawings, and pointed out in the claims hereto appended.

In the drawings, Figure 1 is a perspective view of a broiler constructed in accordance with this invention. Fig. 2 is a detail sectional view.

Like numerals of reference indicate corresponding parts in all the figures of the drawings.

1 and 2 designate jaws or sections of a broiler adapted to hold the meat to be cooked and hinged at one side and detachably secured at the opposite side by a catch 3, so that the jaws or members may be readily opened to admit of a piece of meat or other substance being placed between them. The jaws or sections may be constructed of any suitable material, and to one end of the section or member 1 is hinged a handle 4, composed of sides 5 and 6, connected at their outer ends by a coil 7, whereby the side 6 is made spring-actuated. The side 5 is secured against lateral movement on the member 1, and the other side 6 is capable of lateral movement to engage the recesses 8 of a circular rack 9. The circular rack 9 is mounted on the member 1, and is arranged in a plane at right angles to the plane of the member 1, whereby the hinged handle may be swung over either face of the broiler, so that meat or the like may be held in a horizontal position to expose the same to a uniform heat and so that the handle will extend upward from the members to avoid the hand of the operator being burned by the fire.

It will be seen that the broiler is simple and comparatively inexpensive in construction and that the handle is capable of being arranged at any desired angle to carry the hand of the operator or user away from the fire.

I desire it to be understood that I do not limit myself to the precise details of construction herein shown and described, as I may, without departing from the spirit of the invention, make minor changes therein.

What I claim is—

1. A broiler comprising two members hinged together and adapted to hold the substance to be cooked, a rack secured to one of the members, and a handle hinged to the same member and arranged to engage the rack, whereby the handle may be retained at the desired angle to the members, substantially as described.

2. A broiler comprising two members hinged together, a circular rack arranged on one of the members, and a handle hinged to the same member and arranged to engage the rack, substantially as described.

3. A broiler comprising two members hinged together, a circular rack arranged on one of the members, and a handle hinged to the same member and having a spring-actuated portion arranged to engage the rack, substantially as described.

In testimony that I claim the foregoing as my own I have hereto affixed my signature in the presence of two witnesses.

LA MONT L. BRIGGS.

Witnesses:
F. S. BRIGGS,
J. S. WILKINS.